May 20, 1947. A. G. BUSH 2,420,930
RECIPROCATING BLADE TYPE SLICING MACHINE
Filed July 9, 1945 3 Sheets-Sheet 1
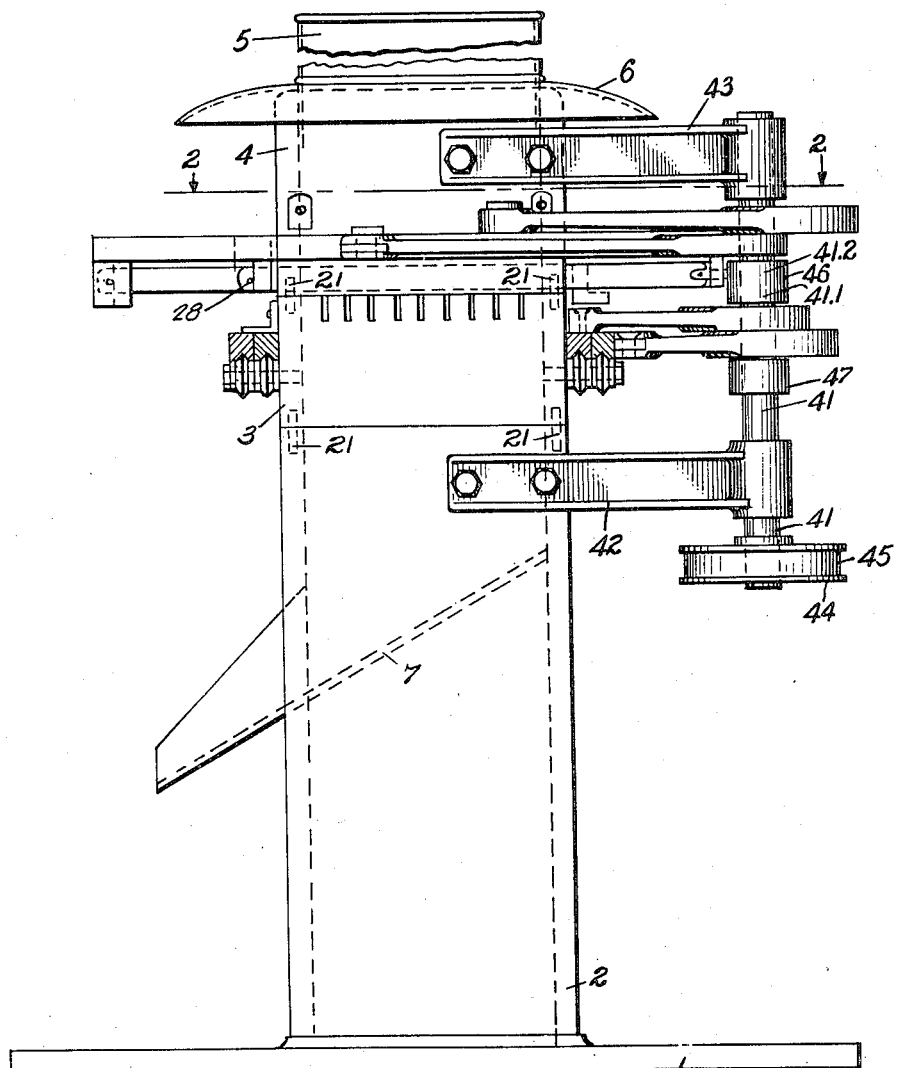
Fig 1
Fig 8
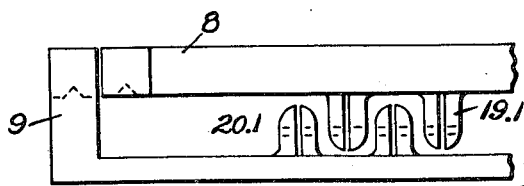
INVENTOR.
Arthur G. Bush May 20, 1947. A. G. BUSH 2,420,930
RECIPROCATING BLADE TYPE SLICING MACHINE
Filed July 9, 1945 3 Sheets-Sheet 2
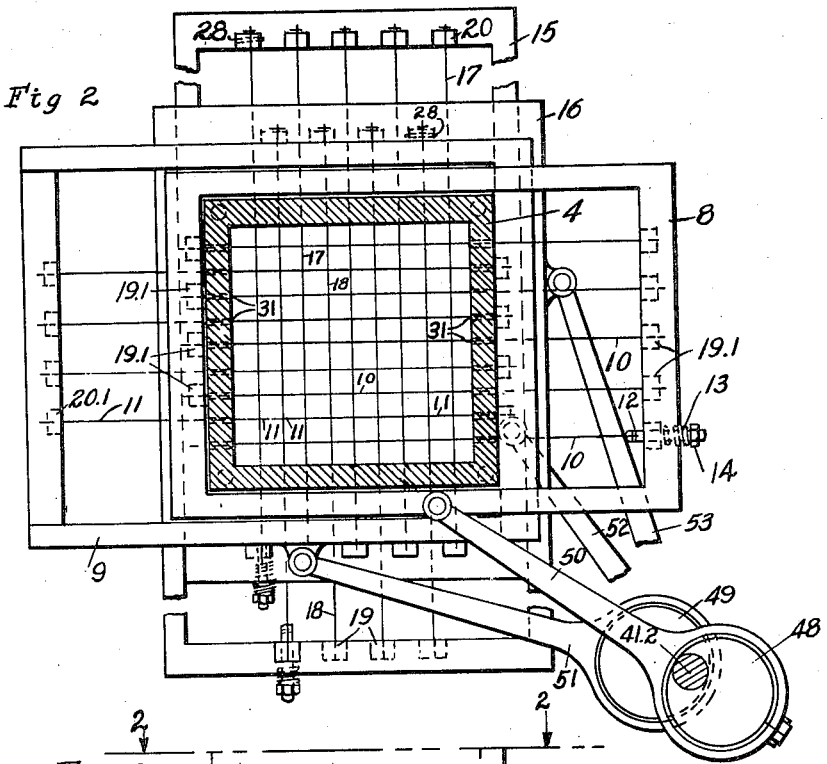
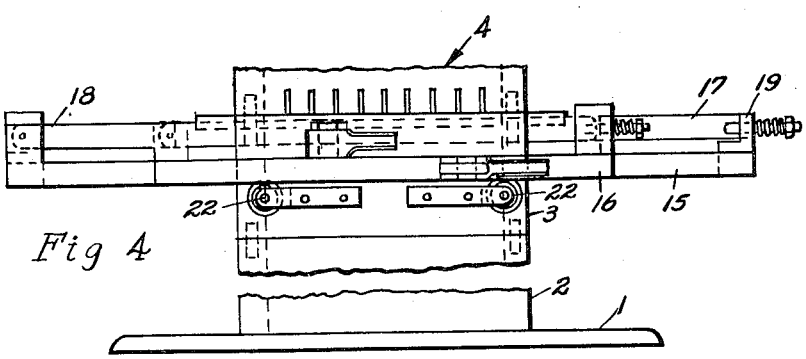
Arthur G. Bush, INVENTOR.

May 20, 1947.   A. G. BUSH   2,420,930
RECIPROCATING BLADE TYPE SLICING MACHINE
Filed July 9, 1945   3 Sheets-Sheet 3
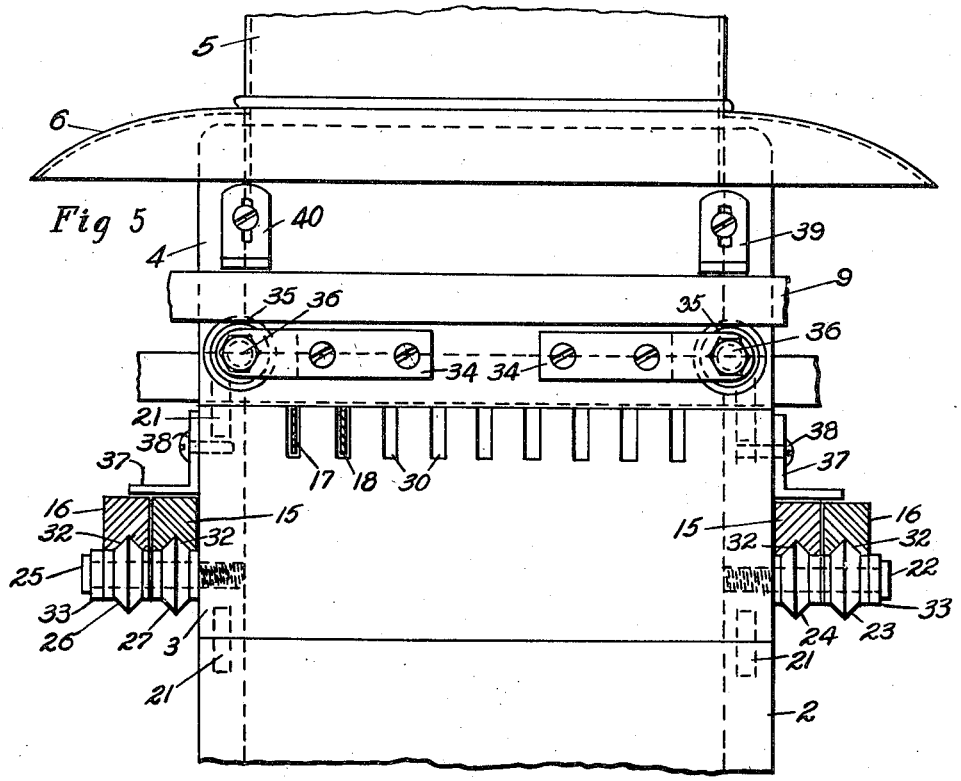
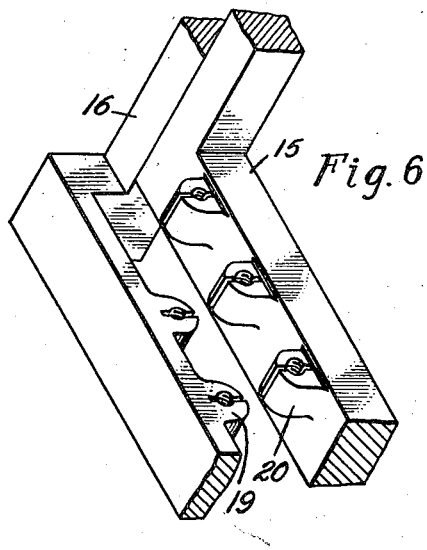
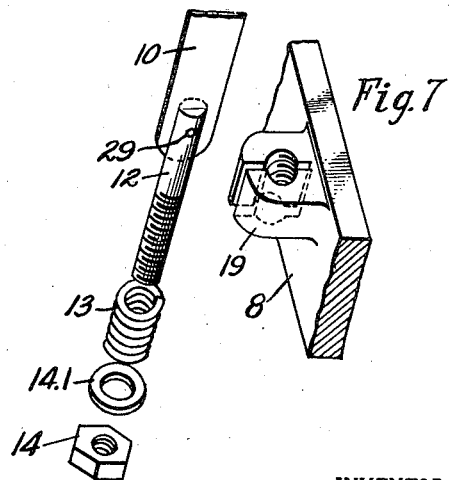
INVENTOR.
Arthur G. Bush Patented May 20, 1947

2,420,930

UNITED STATES PATENT OFFICE 2,420,930

RECIPROCATING BLADE TYPE SLICING MACHINE

Arthur G. Bush, Davenport, Iowa

Application July 9, 1945, Serial No. 603,835

11 Claims. (Cl. 146—78)

My invention relates to improvements in slicing machines of the type used for cutting sliced loaves of bread into small cubes for toasting, etc., and the objects of my invention are:

To provide improved and simplified means for supporting and driving the blades that will reduce friction and insure easy running; to provide convenient means for interchanging of sets of blades for replacement, repair or so as to cut cubes of different sizes; to provide means for protecting the operative mechanism from clogging up with bread crumbs, dust or other foreign matter.

I accomplish these purposes by the means illustrated in the accompanying drawings, which are intended to be illustrative rather than scale or working drawings, and in which—

Figure 1 is a front elevation of my apparatus with the upper conduit foreshortened;

Figure 2 is a horizontal section on the line 2—2 of Figures 1 and 3;

Figure 3 is a detail of the upper section of the body showing transverse frames mounted thereon;

Figure 4 is a detail of the intermediate section of the body with the longitudinal frames mounted thereon and showing in section the relative positions of the transverse frames;

Figure 5 is an enlarged detail showing the conduit with the crumb shield united thereto and the upper and intermediate body sections and the method of mounting the blade frames thereon;

Figure 6 is an enlarged detail in perspective showing the relative arrangements of the inner and outer blade frames and the lugs to hold the blades;

Figure 7 is an enlarged detail showing a resilient means for attaching the blades to the frames;

Figure 8 is a detail end view of parts of frames 8 and 9 from the left of Figure 2.

Similar numerals refer to similar parts throughout the several views.

My apparatus comprises a sectional tubular body having sections 2, 3 and 4, the lowest of which may be united to a base 1 and the sections may be united by dowel pins 21 at each corner or any other suitable means.

The lower section 2 may be formed integral with the base 1 or suitably united thereto. The upper section 4 is united to a conduit 5 preferably tubular to conduct the sliced loaves of bread to the slicing blades.

The blade frames are arranged in upper and lower pairs. To distinguish them, I refer to the upper pair of frames as the transverse blade frames and the lower pair of frames as the longitudinal frames. Each pair of blade frames comprises an inner and an outer frame which are arranged to travel longitudinally in opposite directions in parallel and in a common plane and over the same distances, and the blades on the inner and outer frames are arranged in alternation so that the alternating blades are always traveling in opposite directions.

One pair of frames is arranged to travel at right angles to the other pair. The frames are so positioned that the cutting edges of the blades in a given pair of frames travel substantially in the same plane. The cutting plane of the blades in the lower pair of frames is spaced close to the lower edges of the blades in the upper pair of frames whereby the bread being cut by the upper sets of blades will reach and be contacted by the cutting edges of the lower sets of blades before the bread has passed entirely through the upper sets of blades.

The blade frames are rectangular and each frame consists of two end bars united by two side bars. The end bars are provided with lugs in which the blades are adjustably mounted. Thus the inner frame 15 of the lower pair of frames has lugs 20 extending upwardly from its end bars and the outer frame 16 of the lower pair has corresponding lugs 19 extending downwardly from its end bars and the lugs 19 are spaced so as to alternate with and pass between the lugs 20 as the frames 15 and 16 reciprocate, the end bars of the outer frame 16 being located higher than the end bars of the frame 15 for that purpose.

Likewise, the end of the inner frame 8 of the transverse or upper pair of frames has similar lugs 19.1 depending therefrom and the end bars of the outer frame 9 of the transverse pair of frames has lugs 20.1 extending upwardly therefrom.

One end of each blade may be secured in its corresponding lug by a simple pivot pin 28 and the opposite end of each blade is preferably secured to its corresponding lug by being united to a bolt 12 having a slot at its inner end to which one end of the blade may be secured by a pin 29. Each bolt 12 extends through a suitable bore formed in the corresponding lug 19 and secured thereto by a nut 14 with a compression spring 13 and a washer 14.1 mounted upon the bolt between the nut and the lug.

This form of fastening is illustrated in Figure 7 and the same general form is used to adjustably secure all the blades in the lugs and under proper tension.

Suitable slots 30 are formed in the intermediate section 3 of the body for the passage of the longitudinal blades and similar slots 31 are formed in the lower portion of the section 4 of the body for the passage of the transverse blades. On account of the thinness of the blades they are shown by single lines in Figure 2 as the blades are preferably only about fifteen one-thousandths of an inch in thickness and are too thin to be shown by double lines, although in Figure 5 two of the blades are shown in double lines in order to section them.

The side bars of the longitudinal frames 15 and 16 have their lower faces formed with V-shaped grooves 32 extending lengthwise thereof.

A pair of pivot bolts 22 are secured at one side of the body section 3 carrying rolls 23 and 24 having conical peripheries adapted to fit in the V-shaped grooves. The inner end of the pivot bolts may be threaded and screwed into the body section and the outer ends of the pivot bolts may be reenforced and held in place by brackets or braces 33 secured to the body section by rivets or other suitable means.

Similar pivot bolts 25 are mounted in the opposite side of the body section 3 with rolls 26 and 27 mounted thereon and having conical faces adapted to fit the grooves 32, and with brackets 34 to hold the outer ends of the pivot bolts.

Additional brackets 37 may be secured to the body section 3 by stud bolts 38 or other suitable means in order to secure the frames 15 and 16 against displacement upwardly and corresponding brackets 39 and 40 may be bolted to the body section 4 at the corners thereof to secure the frames 8 and 9 against upward displacement.

In the top of the body section 4 the lower end of the tubular conduit 5 is inserted to conduct the sliced loaves of bread to the cutting blades. In order to prevent the rolls and side bars from becoming clogged with crumbs, I mount upon the conduit 5 a crumb shield 6 of sheet-metal or other suitable material which projects outwardly on all sides of the conduit and extends over the side bars and rolls so as to prevent dust or crumbs from falling down upon them.

In order to carry off the cubes of bread after being sliced, I provide a diagonal chute 7 mounted in the lower section 2 of the body from which the cubes may be taken for packaging by any suitable means.

The frames of my apparatus may be driven by any suitable means.

In Figures 1 and 2 I have shown a cam shaft 41 which may be mounted in suitable brackets 42 and 43 bolted to the body sections 3 and 4 respectively. Upon the lower end of the shaft 41 I mount a pulley 44 adapted to be driven by a belt 45 from any suitable prime-mover.

The shaft 41 is preferably formed in three sections connected by sleeves 46 and 47 in which the shaft sections may be suitably splined. When arranged as here described, the conduit 5 may be readily removed from the upper end of the body section 4. The body section 4 can then be lifted from the body section 3 and carry with it the transverse frames and the upper section 41.2 of the drive shaft.

The body section 3 can then be lifted off the lower section 2 and carry with it the intermediate portion 41.1 of the drive shaft. These elements may then be replaced with similar elements having a different spacing of the blades so as to cut either larger or smaller cubes, thus affording simple convenient means for changing the gauge of the machine and also for replacing worn or broken blades when necessary, although the slots and blades will be so proportioned that a broken blade can be removed and a new blade inserted when desired without taking the body apart.

Cams 48 and 49 are mounted upon the cam shaft section 41.2 with connecting rods 50 and 51 having one end mounted upon said cams and their opposite ends pivotally united to the side bars of the frames 8 and 9 whereby the frames 8 and 9 will be reciprocated simultaneously and in opposite directions as the drive shaft revolves.

Similar cams are mounted upon the intermediate section 41.1 of the cam shaft and have links to drive the connecting rods 52 and 53, the opposite ends of which are pivotally united to the side bars of the frames 15 and 16 respectively and cause them to reciprocate simultaneously but in opposite directions and at right angles to the line of travel of the frames 8 and 9.

In the operation of my apparatus, the sliced loaves of bread are fed into the conduit 5 either manually or by any suitable mechanical feeder and are carried by gravity or other suitable means to the cutting blades of the frames 8 and 9 where they are sliced into long, fingerlike strips. Before these strips have passed entirely through the blades 10 and 11, the lower edge of the strips come into contact with the cutting edges of the blades 17 and 18 carried by the frames 15 and 16 and are cut into substantially cubical form after which they pass to the chute 7 and out of the side of the body 2.

While I have shown the body and conduit in a vertical position, if desired they may be mounted in an inclined or horizontal position and a mechanical feeding device added.

It is obvious that various modifications may be made in the size, form and proportion of the various parts of my apparatus without departing from the spirit of my invention and I do not limit my claims to the precise forms shown in the drawings.

I claim:

1. A slicing machine comprising a tubular body, upper and lower pairs of rectangular blade-holding frames surrounding the body each pair consisting of an inner and an outer frame and each frame having end and side bars suitably united, the side bars of the outer frames being arranged outside of and parallel with and adjacent the side bars of the inner frames, grooves formed in the lower faces of the side bars, supporting rolls pivotally mounted on the body having their peripheries arranged to fit into the grooves of the side bars respectively and support and guide the frames during their travel, a plurality of blades mounted upon each frame and corresponding slots formed in the body to permit travel of the blades therethrough, and means for reciprocating the frames of each pair in opposite directions simultaneously and with the frames of the lower pair traveling at right angles to the frames of the upper pair.

2. A slicing machine comprising a tubular body, upper and lower pairs of rectangular blade frames surrounding and carried by the body each pair consisting of an inner and an outer frame having side bars and end bars suitably united, the side bars of the outer frames being arranged parallel with and alongside of the side bars of the inner frames, V-shaped grooves formed in the lower face of the side bars, supporting rolls pivotally mounted on the body having conical peripheries arranged to fit into the grooves of the side bars and support and guide the frames during their travel, a plurality of blades mounted upon each frame and corresponding slots formed in the body to permit travel of the blades therethrough, and means for reciprocating the frames of each pair in opposite directions simultaneously and with the frames of the lower pair traveling at right angles to the frames of the upper pair.

3. A slicing machine as described in claim 2 and said body being arranged in separable upper, intermediate and base sections with the upper pair of frames mounted upon the upper section and the lower pair of frames mounted upon the intermediate section whereby interchangeable frames with differently spaced blades may be utilized with a single base section.

4. A slicing machine as described in claim 2, said body being arranged in a plurality of separable interlocking sections, one or more of which may be removed and replaced by one or more other sections fitted with differently spaced blades.

5. A slicing machine as described in claim 1, and a conduit removably secured to the tubular body to guide sliced loaves of bread to the slicing blades.

6. A slicing machine as described in claim 1, a conduit removably secured to the tubular body to guide sliced loaves of bread to the slicing blades, and a discharge chute mounted in the body to carry off the cubed bread or other matter sliced by the blades.

7. A slicing machine comprising a tubular body, upper and lower pairs of rectangular blade-holding frames each pair consisting of an inner and an outer frame, the side bars of the outer frame being arranged parallel with and alongside of the side bars of the inner frame, each frame having side bars and end bars suitably united, grooves formed in the lower face of the side bars, supporting rolls pivotally mounted on the body having their peripheries arranged to fit into the grooves of the side bars and support and guide the frames during their travel, a plurality of blades mounted upon each frame and corresponding slots formed in the body to permit travel of the blades therethrough, and driving means for reciprocating the frames of each pair in opposite directions simultaneously and with the frames of the lower pair traveling at right angles to the travel of the frames of the upper pair, said driving means comprising a drive shaft supported by brackets secured to the body and cams united to the drive shaft and connecting rods corresponding to the cams and frames, each having one end fitted to its corresponding cam and its opposite end pivotally united to a side bar of its corresponding frame.

8. A slicing machine as described in claim 2, said body being arranged in a plurality of separable interlocking sections, one or more of which may be removed and replaced by one or more other sections fitted with differently spaced blades, said means for reciprocating the frames comprising a sectional drive shaft having one section carried by a bracket united to the upper body section and removable therewith.

9. A slicing machine as described in claim 2, said body being arranged in a plurality of separable interlocking sections, one or more of which may be removed and replaced by one or more other sections fitted with differently spaced blades, said driving means comprising a sectional drive shaft having sections corresponding to the body sections and removable therewith.

10. A slicing machine as described in claim 1, and retainer brackets united to the body above and adjacent the side bars of the frames whereby the frames may be prevented from being displaced upwardly.

11. A slicing machine as described in claim 1, retainer brackets united to the body above and adjacent the side bars of the frames whereby the frames may be prevented from being displaced upwardly, and means to guide the material to be cut to the slicing blades and to discharge it from the body after being cut into cubical form.

ARTHUR G. BUSH.

REFERENCES CITED

The following references are of record in the file of this patent:

UNITED STATES PATENTS

| Number | Name | Date |
| --- | --- | --- |
| 2,327,018 | Criner | Aug. 17, 1943 |
| 2,388,725 | Criner | Nov. 13, 1945 |
| 2,036,403 | Friesel | Apr. 7, 1936 |
| 1,999,449 | Erickson | Apr. 30, 1935 |
| 2,236,176 | Jagenburg | Mar. 25, 1941 |
| 1,995,096 | Fritz | Mar. 19, 1935 |